C. T. PARKER.
MACHINE FOR AUTOMATICALLY REGULATING THE FLOW OF LIQUIDS.
APPLICATION FILED AUG. 11, 1910.
1,028,132.
Patented June 4, 1912.
2 SHEETS—SHEET 2.
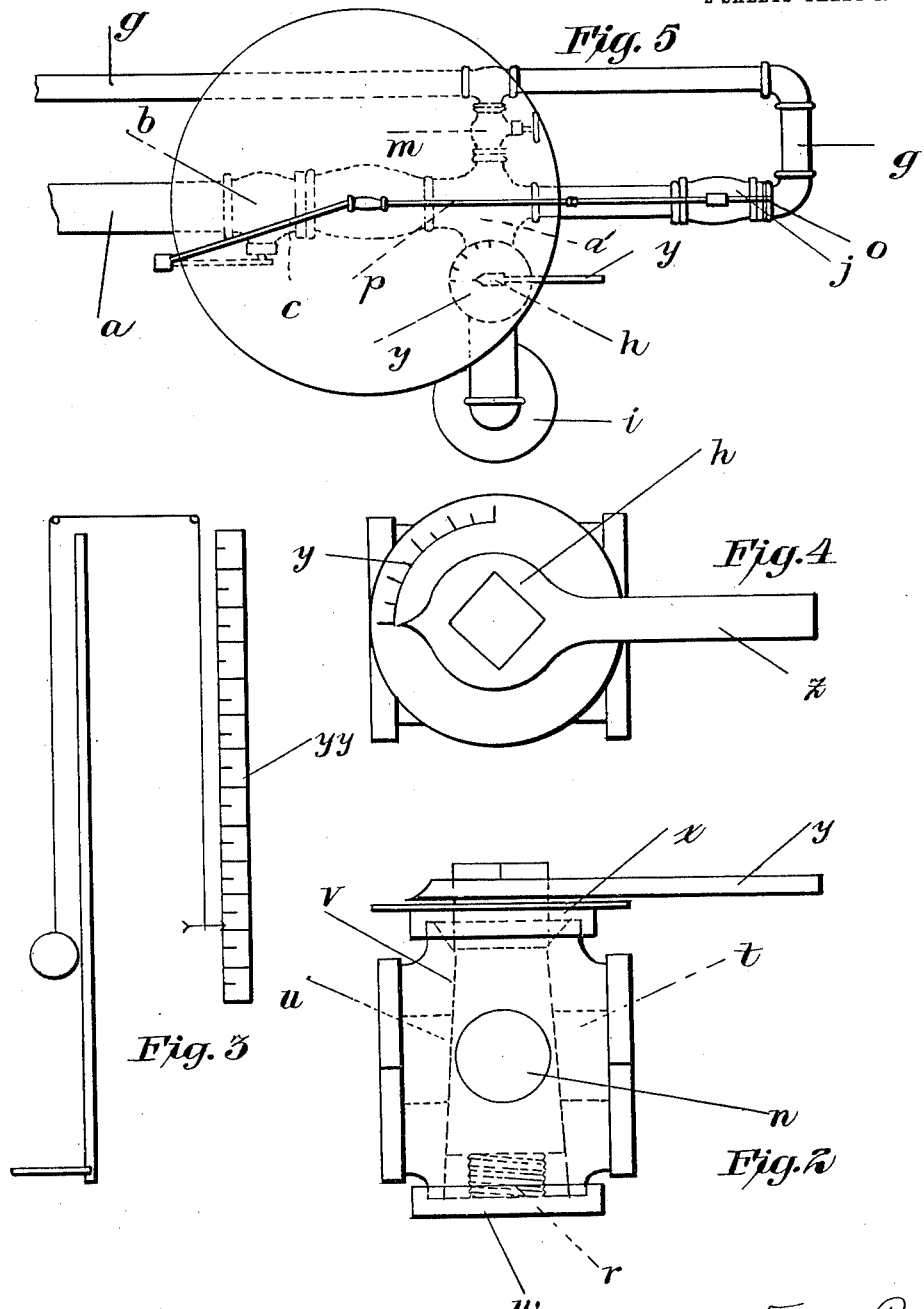

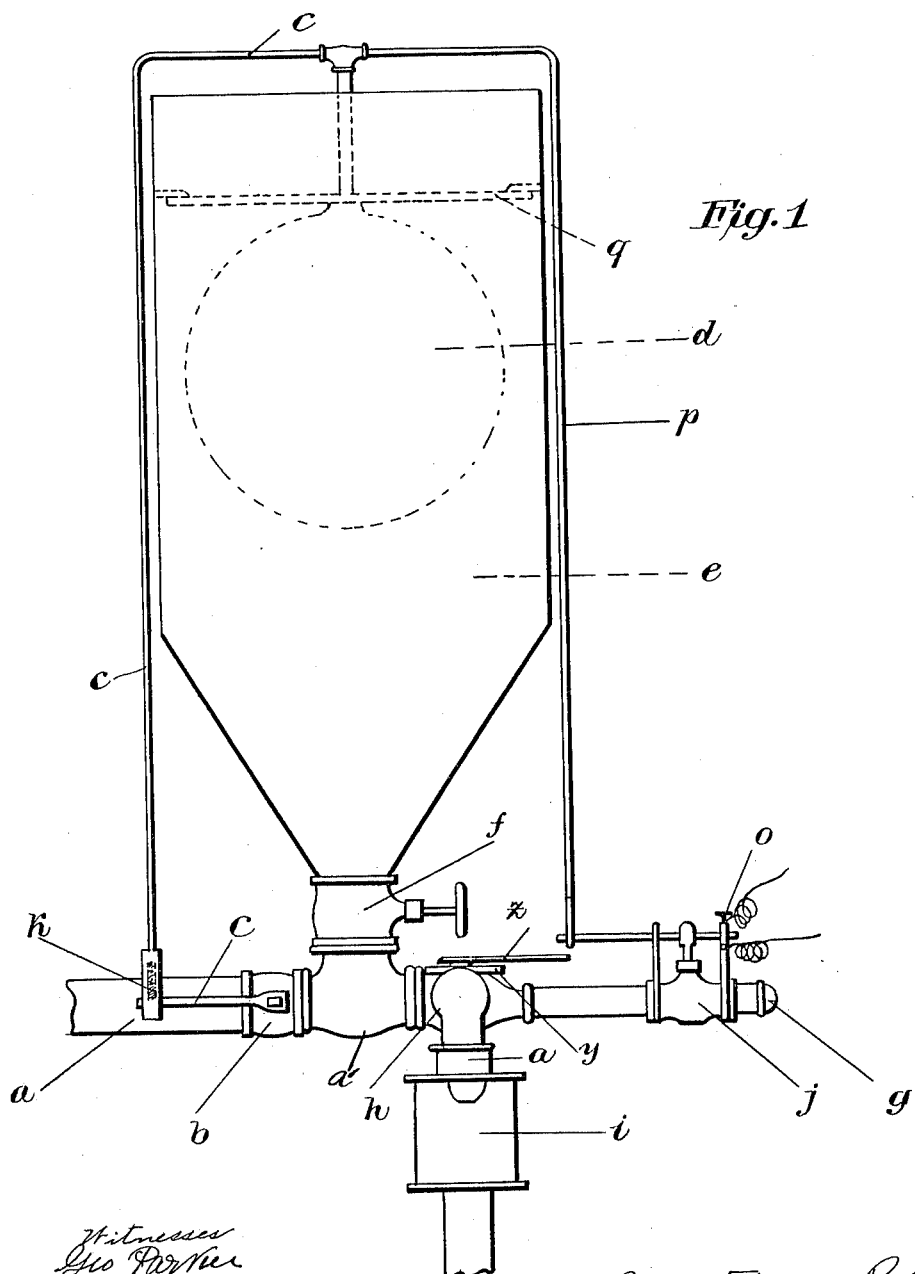

UNITED STATES PATENT OFFICE.

CHARLES T. PARKER, OF ALTON, ILLINOIS.

MACHINE FOR AUTOMATICALLY REGULATING THE FLOW OF LIQUIDS.

1,028,132.  Specification of Letters Patent.  Patented June 4, 1912.

Application filed August 11, 1910. Serial No. 576,762.

*To all whom it may concern:*

Be it known that I, CHARLES T. PARKER, a citizen of the United States, residing at Alton, in the State of Illinois, have invented certain new and useful improvements in machines for automatically regulating the flow of liquids so as to make same a continuous uniform stream and minimizing its interruption or stoppage from sediment, precipitates, dirt, sand, or gravel, and especially for the regulation of streams carrying coagulant matter in water-filtering plants, and in cleaning and preserving the pipes or ducts carrying the coagulant stream and preventing in some measure the chemical, physical, and other changes resulting from the exposure of such stream to the air, and also preventing the sucking of air by pumping-engines while drawing the coagulant stream, when such stream is interrupted for any reason, of which the following is a full, clear, and exact description, reference being had to the accompanying drawings, forming a part thereof.

In the drawings, Figure 1 is a side elevation of the apparatus embodying my invention. Fig. 2 is an elevation of the cock preferred as a means of regulating the flow of the stream. Fig. 3 is an elevation of a dial placed on the coagulant tank. Fig. 4 is a plan view of a similar dial placed around the cock $j$ for the guidance of, and to be operated by, the attendant. Fig. 5 is a top plan of the apparatus shown in Fig. 1.

Heretofore in passing coagulant fluids containing iron or lime, difficulty has been experienced in the following particulars.

1. The precipitation of the coagulant materials, or dirt, sand or gravel, or other foreign matter to the bottom of the tank pipe or duct caused the same to become clogged, thus interrupting, diminishing, or stopping altogether, the flow of the stream.

2. The action of the atmosphere on the lime, or iron, when exposed in open tanks or ducts, caused a scale to form in the tank or ducts, and also in the pipes leading to the pumping engine.

3. If the coagulant fluid is not forced through by the suction of the pumping engine, the coagulants are not thoroughly mixed with the water, and the filtration is imperfect. On the other hand, if the fluid containing iron is drawn through the pipes by the suction of the engine, any clogging or interruption of the stream allows the engine to pump air, resulting in the "running away" of the engine, loss of steam pressure, and general demoralization in the operation of the plant.

4. When the pumps are used, the valves, plungers, and other parts in any wise exposed to the stream become coated and worn making it necessary to make frequent stops to clean the machinery, and generally rendering the parts exposed unfit for continuous use.

It is important in the filtration of large bodies of water where millions of gallons are introduced into the reservoirs daily in fixed or regular hourly quantities, that the stream bearing the coagulants should also be fixed and uniform as to the quantities delivered hourly into the water to be filtered, and that there should be no lack of uniformity in the discharge of the several streams or pipes carrying the different kinds of coagulant materials.

Because that uniformity has not heretofore been secured, the filtration has been imperfect and sometimes almost abortive, and it is the object of my invention to obviate and remove all these difficulties, and secure a perfect admixture of coagulant materials in the pipe or duct when they are discharged into the reservoirs of water to be filtered, thus forming a perfect coagulant flake to seize on and precipitate the impurities in the water.

My present invention consists of a combination of improvements and means whereby each of these difficulties is obviated or overcome. It presents other and further advantages which will become apparent from a detailed description thereof, which is as follows:—

In Fig. 1, "$aa$" represents the main supply or carrying pipe through which the coagulant fluids pass from the supply tank either to the suction engine, or to the discharge pipe, as one or the other may require, said main supply pipe comprising a fluid conveying chamber $a'$. It is preferably airtight or nearly so. Located in advance of the fluid conveying chamber and governing the inlet thereto is the valve "$b$." This is opened or closed by a lever "$c$" which is in turn operated and controlled by a float "$d$" in the tank "$e$" superimposed on the chamber "$a'$" and connecting with it.

"$b$" is a cock closely fitting into a ground seat, and perforated with a round hole "$n$"

(Fig. 2) corresponding to a small hole "$t$" in the seat, though any other value susceptible of being controlled to the extent of its being opened or closed by a lever, may be used. The advantage of the round hole is that it precludes stoppage from grains, sediment, or small particles of the coagulant fluid, dirt, sand or gravel that may be in said fluid. To make valve "$b$" watertight and airtight and at the same time as nearly frictionless as possible, the key "$u$" is pressed firmly into the seat "$v$" by a small spring "$r$" held in place by a cap "$w$." At the lever end of the key a ring or cap "$x$" prevents leaking or the admission of air.

The tank "$e$" is elevated above the chamber "$a'$" but opens into it through the cock "$f$," through which the fluid from the chamber rises into it. It is made with a slanting bottom to prevent precipitates or sediment settling in the bottom and interfering with the float, though it may be made with a flat bottom; it is sealed at the top by a leather, rubber or metal cap "$q$" (Fig. 1) through which passes a piston rod attached to the float "$d$." The cock "$f$" enables the operator to close tank "$e$" whenever it is necessary to turn the water into the pipe chamber "$a'$" through the pressure pipe "$g$" to cleanse the chamber. The height of the fluid in "$e$" is regulated by cock "$h$" which in turn is regulated by the operator by means of a lever handle "$z$" (Fig. 4) which may pass over a graded dial "$y$." By opening cock "$h$" which is similar in construction to valve "$b$" the water in tank "$e$" is lowered, which immediately lowers float "$d$" thus pressing down through "$c$" the lever handle of valve "$b$." This opens wider the hole or fissure in "$b$" permitting a greater flow of the liquid from the supply tank from which the chamber "$a'$" is fed. On the supply tank is placed a vertical dial "$yy$" complementing the dial "$y$" on which the index working in unison with the lever handle of "$h$" registers the periodical discharge of the fluid from the supply tank.

The letter "$g$" represents a water pressure sure pipe opening through cock "$m$" (Fig. 5) into the fluid carrying chamber "$a'$" the purpose of which is to discharge a stream under pressure into the chamber "$a'$" to cleanse said chamber of any sediment or other deposit that may impede or stop the flow of the fluid therethrough. The cock "$j$" is automatically controlled by the lever "$p$," which is also controlled by the float "$d$." Its purpose is to open a connection with the water pressure pipe "$g$" in such manner that should the flow of the coagulant fluid through chamber "$a'$" be checked or interrupted, the float falls, the lever "$p$" is pressed down opening cock "$j$," which lets the water from the pressure pipe "$g$" into the chamber "$a'$," and this passing through the outlet of said chamber continues to feed the suction of the pumping engine. Cock "$j$" is not opened by a slight fall of float "$d$," such as is caused by opening cock "$h$," but only when the fluid in tank "$e$" is exhausted or greatly reduced by the suction from the engine when the flow through the chamber "$a'$" has been impeded or stopped by clogging or other cause. In order that float "$d$" may fall low enough to open "$j$" a spring is placed in lever "$c$" at "$k$" which permits "$c$" to fall low enough to open "$j$."

The letter "$i$" is a glass cylinder or tube through which the operator can watch the flow of the coagulant fluid. This is important because if there should be any interruption in the flow of the coagulant fluid, the operator can detect same. The same purpose is further accomplished by means of an electrical or automatic alarm "$o$" sounded by the opening of cock "$j$" with which said alarm is connected. This warns the operator that the engine is sucking clear water from the pressure pipe instead of the coagulant fluid intended to be drawn. By means of the glass cylinder "$i$" and the alarm "$o$" it is possible for the operator to ascertain within a few minutes that the coagulant stream has been interrupted.

It will be noted that by the use of an airtight chamber through which the fluid is carried, but little air enters the chamber or its adjuncts, and the fluid stream is nowhere exposed to the air from the time it leaves the supply tank till it is discharged into the water to be coagulated, but the machine works quite satisfactorily without the use of seals to exclude the air.

The description hitherto has been more particularly a description of the process and means of controlling and making uniform the flow of iron coagulants from the iron coagulant supply tank to the pumping engine. The same combination of means is effective for the purpose of regulating the flow from the lime coagulant tank into the discharge pipe, with the difference that the lever "$p$", the cock "$j$" and the alarm "$o$" noted in Figs. 1 and 5 are omitted because the flow from the lime tank passes directly into the discharge of the pumping engine, and there being no suction, it is unnecessary to provide a means of turning water into chamber "$a'$" for the purpose of preventing the sucking of air. All other parts, means and devices for regulating and making uniform the flow, and for cleansing the chamber "$a'$" from precipitates, sand and other impeding deposits remain the same as in the combination above described.

Having described my invention, what I claim, is:—

1. In an apparatus of the class described, a fluid conveying chamber; a valve controlling the inlet to said chamber; means for automatically operating said valve, consisting of a tank in communication with said chamber, a float in said tank, a lever connected with said float, and a handle connecting said lever and valve; means for permitting the efflux of fluid from said chamber in regulable quantities; and an observation glass tube forming the outlet from said chamber, all substantially as described.

2. In an apparatus of the class described, a fluid conveying chamber a valve controlling the inlet to said chamber; means for automatically operating said valve, consisting of a tank in communication with said chamber, a float in said tank, a lever connected with said float, and a handle connecting said lever and valve; means for permitting the efflux of fluid from said chamber in regulable quantities consisting of a valve controlling the outlet of said chamber, a handle opening or closing same, a graduated dial over which the handle passes, and an observation glass tube forming the outlet from said chamber; all substantially as described.

3. In an apparatus of the class described, a fluid conveying chamber; a valve controlling the inlet to said chamber; means for automatically operating said valve, consisting of a tank communicating through a valve with said chamber, a float in said tank, a lever connected with said float, and a handle connecting said lever and said first named valve; means for permitting the efflux of fluid from said chamber in regulable quantities, consisting of a valve controlling the outlet of said chamber, a handle opening or closing said valve, a graduated dial over which the handle passes, and an observation glass tube forming the outlet from said chamber; and means for cleansing said chamber and parts in communication therewith, consisting of a pressure water pipe in communication with said chamber, and a valve controlling the inlet from said pressure pipe into said chamber; all substantially as described.

4. In an apparatus of the class described, a fluid conveying chamber, a valve controlling the inlet to said chamber; means for automatically operating said valve consisting of a tank communicating through a valve with said chamber, a float in said tank, a lever connected with said float, and a handle connecting said lever and said first named valve; means for permitting the efflux of fluid from said chamber in regulable quantities, consisting of a valve controlling the outlet of said chamber, a handle opening or closing said valve, a graduated dial over which the handle passes, and an observation glass tube forming the outlet from said chamber; means for cleansing said chamber and parts in communication therewith, consisting of a pressure water pipe in communication with said chamber, and a valve controlling the inlet from said pressure pipe into said chamber; means for maintaining a flow of fluid to the suction engine when the regular flow of fluid through said chamber is impeded or stopped, comprising a second valve controlling a second inlet from said pressure water pipe to said chamber, means for automatically operating said second valve, comprising a lever connected with said float and a handle connecting said lever and said last mentioned valve, and an automatic alarm sounded by said last mentioned valve; all substantially as described.

In testimony whereof I affix my signature in presence of two witnesses.

CHAS. T. PARKER.

Witnesses:
 CHAS. W. MOORE,
 GEO. PARKER.